US008140679B2

(12) United States Patent
Hatanaka

(10) Patent No.: US 8,140,679 B2
(45) Date of Patent: *Mar. 20, 2012

(54) METHOD AND SYSTEM FOR AUTOMATED SESSION RESOURCE CLEAN-UP IN A DISTRIBUTED CLIENT-SERVER ENVIRONMENT

(75) Inventor: Iwao Hatanaka, Acton, MA (US)

(73) Assignee: International Business Machines Corporation, Armonk, NY (US)

( * ) Notice: Subject to any disclaimer, the term of this patent is extended or adjusted under 35 U.S.C. 154(b) by 159 days.

This patent is subject to a terminal disclaimer.

(21) Appl. No.: 12/348,182

(22) Filed: Jan. 2, 2009

(65) Prior Publication Data

US 2009/0113050 A1  Apr. 30, 2009

Related U.S. Application Data

(63) Continuation of application No. 09/781,616, filed on Feb. 12, 2001, now Pat. No. 7,493,391.

(51) Int. Cl.
*G06F 15/173* (2006.01)
*G06F 11/00* (2006.01)

(52) U.S. Cl. ........ 709/226; 709/223; 709/224; 709/225; 709/227; 714/4

(58) Field of Classification Search ........... 709/223–226
See application file for complete search history.

(56) References Cited

U.S. PATENT DOCUMENTS

| 4,121,201 A | 10/1978 | Weathers |
| 4,141,006 A | 2/1979 | Braxton |
| 4,245,245 A | 1/1981 | Matsumoto et al. |
| 4,860,379 A | 8/1989 | Schoeneberger et al. |
| 4,935,724 A | 6/1990 | Smith |
| 4,935,725 A | 6/1990 | Turnau |

(Continued)

FOREIGN PATENT DOCUMENTS

JP  63174153  7/1988

(Continued)

OTHER PUBLICATIONS

Moore et al., "Building Evolvable Systems: The ORBlite Project", Article 9, Feb. 1997, Hewlett-Packard Journal, 14 pages, abstract.

(Continued)

*Primary Examiner* — Ashok Patel
*Assistant Examiner* — Evans Desrosiers
(74) *Attorney, Agent, or Firm* — Douglas A. Lashmit; Hoffman Warnick LLC

(57) ABSTRACT

Systems and methods for automatically managing session resources in a distributed network of processors are disclosed. In one embodiment of the invention, a system for managing the use of resources in a system where a remote client uses resources at a server for a limited duration includes: a stored listing of at least one resource being used at the server and the client using that resource; a system which identifies that a remote client is no longer using resources at the server; and in response to the system identifying that the client is no longer using resources at the server, a mechanism which removes the resources which had been used by the client when the client was connected to the server, whereby the resources being used by a client may be used by other clients after the client has disconnected from the server.

5 Claims, 3 Drawing Sheets

U.S. PATENT DOCUMENTS

| | | | |
|---|---|---|---|
| 4,991,123 A | 2/1991 | Casamassima | |
| 5,051,723 A | 9/1991 | Long et al. | |
| 5,077,730 A | 12/1991 | Arrowood et al. | |
| 5,091,713 A | 2/1992 | Horne et al. | |
| 5,142,269 A | 8/1992 | Mueller | |
| 5,233,513 A | 8/1993 | Doyle | |
| 5,388,156 A | 2/1995 | Blackledge, Jr. et al. | |
| 5,396,636 A | 3/1995 | Gallagher et al. | |
| 5,404,544 A | 4/1995 | Crayford | |
| 5,406,260 A | 4/1995 | Cummings et al. | |
| 5,432,939 A | 7/1995 | Blackledge, Jr. et al. | |
| 5,544,318 A | 8/1996 | Schmitz et al. | |
| 5,568,611 A | 10/1996 | Khatri et al. | |
| 5,572,644 A | 11/1996 | Liaw et al. | |
| 5,574,786 A | 11/1996 | Dayan et al. | |
| 5,590,376 A | 12/1996 | Kou | |
| 5,625,775 A | 4/1997 | Davis et al. | |
| 5,642,515 A | 6/1997 | Jones et al. | |
| 5,680,619 A | 10/1997 | Gudmundson et al. | |
| 5,710,727 A | 1/1998 | Mitchell et al. | |
| 5,712,973 A | 1/1998 | Dayan et al. | |
| 5,717,614 A | 2/1998 | Shah et al. | |
| 5,721,910 A | 2/1998 | Unger et al. | |
| 5,742,758 A | 4/1998 | Dunham et al. | |
| 5,754,752 A | 5/1998 | Sheh et al. | |
| 5,765,174 A | 6/1998 | Bishop | |
| 5,774,870 A | 6/1998 | Storey | |
| 5,801,958 A | 9/1998 | Dangelo et al. | |
| 5,819,270 A | 10/1998 | Malone et al. | |
| 5,838,973 A | 11/1998 | Carpenter-Smith et al. | |
| 5,859,979 A | 1/1999 | Tung et al. | |
| 5,870,605 A | 2/1999 | Bracho et al. | |
| 5,870,746 A | 2/1999 | Knutson et al. | |
| 5,907,704 A | 5/1999 | Gudmundson et al. | |
| 5,940,075 A | 8/1999 | Mutschler, III et al. | |
| 5,946,465 A | 8/1999 | Chmielewski et al. | |
| 6,021,493 A | 2/2000 | Cromer et al. | |
| 6,067,634 A * | 5/2000 | Nelson | 714/4.4 |
| 6,122,628 A | 9/2000 | Castelli et al. | |
| 6,205,447 B1 | 3/2001 | Malloy | |
| 6,275,857 B1 | 8/2001 | McCartney | |
| 6,301,579 B1 | 10/2001 | Becker | |
| 6,305,007 B1 | 10/2001 | Mintz | |
| 6,381,321 B1 * | 4/2002 | Brown et al. | 379/207.02 |
| 6,477,569 B1 | 11/2002 | Sayan et al. | |
| 6,510,420 B1 | 1/2003 | Cessna et al. | |
| 6,510,550 B1 | 1/2003 | Hightower et al. | |
| 6,539,481 B1 | 3/2003 | Takahashi et al. | |
| 6,542,900 B1 | 4/2003 | Xia | |
| 6,769,023 B1 | 7/2004 | Novaes et al. | |
| 6,781,979 B1 | 8/2004 | Ebata et al. | |
| 6,904,459 B1 | 6/2005 | Alam et al. | |
| 7,493,391 B2 | 2/2009 | Hatanaka | |
| 2002/0112054 A1 | 8/2002 | Hatanaka | |
| 2002/0147962 A1 | 10/2002 | Hatanaka et al. | |

FOREIGN PATENT DOCUMENTS

| | | |
|---|---|---|
| JP | 10161976 | 6/1998 |
| JP | 11025126 | 1/1999 |
| JP | 11119986 | 4/1999 |
| JP | 11143827 | 5/1999 |
| JP | 2000227906 | 8/2000 |
| JP | 2000250768 | 9/2000 |
| JP | 2001005791 | 1/2001 |
| JP | 2001337935 | 7/2001 |
| JP | 2002564731 | 2/2002 |
| WO | 9917236 | 4/1999 |

OTHER PUBLICATIONS

Stets et al., Component-based Operating System APIs: A Versioning and Distributed Resource Solution, Jul. 1999, Technical Report, MSR-TR-99-24, Dept. of Computer Science University of Rochester, 37 pages.

Comella-Dorda et al., "A Survey of Black-Box Modernization Approaches for Information Systems", Proceedings of the International Conference on Software Maintenance (ICSM'00), Jun. 14, 1999, 11 pages.

Shinichi, "Enterprise JavaBeans enterprise oriented component model intended to extend the range of server application", Java Press, Gijutsu-Hyoronsha, Aug. 15, 1998, vol. 2, pp. 84-95 (CS-ND-139-10).

Higuchi "Practice! server-side Java No. 4 creating remotely runnable EJB beans making beans adapted to EJB, and invoking via network," Nikkei Open System, Nikkei BP, Dec. 15, 2000, No. 93, p. 246-255.

Isoyama, "New generation Java opening its generation at server side—easy understanding server side Java," Nikkei Software, Nikkei BP, vol. 3, No. 8, p. 92-101.

Johnson, "A beginner's guide to Enterprise JavaBeans", May 9, 2005, 9 pages.

Morgan, "Enterprise JavaBeans: Coming soon to a server near you", May 9, 2005, 7 pages.

Morgan, "Applied CORBA: Integrating legacy code with the web", May 9, 2005, 6 pages.

Lee et al., The Design and Implementation of Enterprise JavaBean (EJB) Wrapper for Legacy System, IEEE 2001, p. 1988-1992.

"Program Correctness Proof," Dictionary of Computing, 1996, 3 pages, 4th edition, Oxford University Press.

Sintes, Tony, "Does Java pass by reference or pass by value? Why can't you swap Java," 4 pages.

Vogel, Andreas, "Building Enterprise Applications for the Net with EJB, CORBA, and XML," 2004, 20 pages.

"Managing Classes and Interfaces of an Enterprise JavaBean Component," Research Disclosure, May 1999, 4 pages.

"Mangement of Generated Classes", Research Disclosure, Jun. 1999, 2 pages.

Stets, "Component-based APIs for versioning and distributed applications", IEEE, Computer, vol. 32, No. 7, pp. 54-61, Jul. 1999, abstract.

Luu, Le Hien, U.S. Appl. No. 09/781,616, Notice of Allowance, Oct. 6, 2008, 4 pages.

Luu, Le Hien, U.S. Appl. No. 09/781,616, Office Action, May 27, 2008, 5 pages.

Luu, Le Hien, U.S. Appl. No. 09/781,616, Office Action, Jul. 18, 2005, 7 pages.

Luu, Le Hien, U.S. Appl. No. 09/781,616, Office Action, Jun. 4, 2004, 11 pages.

Luu, Le Hien, U.S. Appl. No. 09/781,616, Final Office Action, Jan. 10, 2006, 7 pages.

Luu, Le Hien, U.S. Appl. No. 09/781,616, Final Office Action, Nov. 23, 2004, 12 pages.

Wood, William H., U.S. Appl. No. 09/781,615, Final Office Action, Nov. 1, 2005, 8 pages.

Wood, William H., U.S. Appl. No. 09/781,615, Office Action, May 19, 2005, 9 pages.

Wood, William H., U.S. Appl. No. 09/781,615, Final Office Action, Oct. 4, 2004, 9 pages.

Wood, William H., U.S. Appl. No. 09/781,615, Office Action, Mar. 24, 2004, 8 pages.

Wood, William H., U.S. Appl. No. 09/781,615, Examiner's Answer, Jun. 5, 2006, 14 pages.

Gannod et al., "An Architecture-Based Approach for Synthesizing and Integrating Adapters for Legacy Software", 2000 IEEE, pp. 128-137.

* cited by examiner

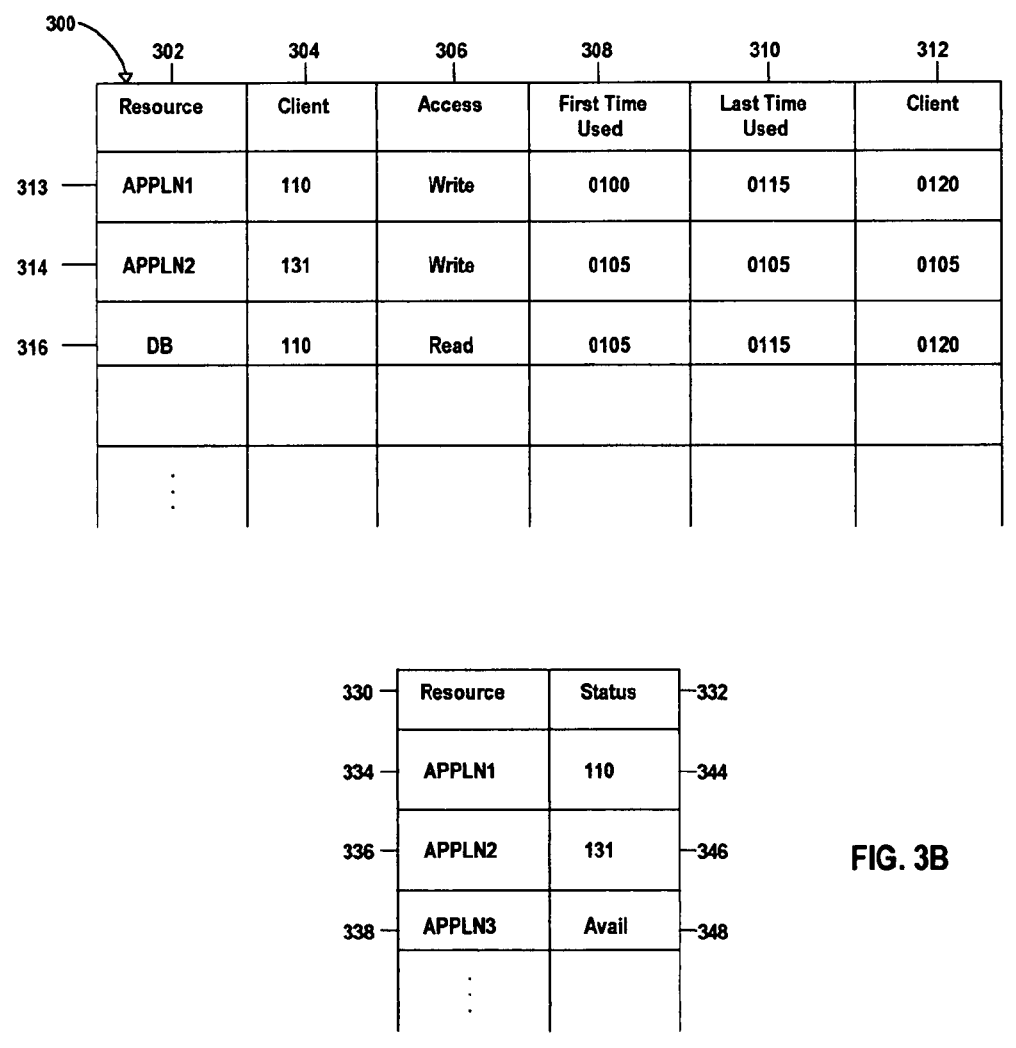

| | 302 | 304 | 306 | 308 | 310 | 312 |
|---|---|---|---|---|---|---|
| 300 | Resource | Client | Access | First Time Used | Last Time Used | Client |
| 313 | APPLN1 | 110 | Write | 0100 | 0115 | 0120 |
| 314 | APPLN2 | 131 | Write | 0105 | 0105 | 0105 |
| 316 | DB | 110 | Read | 0105 | 0115 | 0120 |
| | | | | | | |
| ⋮ | | | | | | |

FIG. 3A

| | Resource | Status | |
|---|---|---|---|
| 330 → | Resource | Status | ← 332 |
| 334 → | APPLN1 | 110 | ← 344 |
| 336 → | APPLN2 | 131 | ← 346 |
| 338 → | APPLN3 | Avail | ← 348 |
| | ⋮ | | |

FIG. 3B

METHOD AND SYSTEM FOR AUTOMATED SESSION RESOURCE CLEAN-UP IN A DISTRIBUTED CLIENT-SERVER ENVIRONMENT

CONTINUATION APPLICATION

The following application is a continuation of U.S. patent application Ser. No. 09/781,616, filed Feb. 12, 2001 now U.S. Pat. No. 7,493,391.

CROSS-REFERENCE TO RELATED PATENTS

The present invention is related to the following patents which are specifically incorporated herein by reference:

Pending patent application Ser. No. 09/409,345 filed Sep. 30, 1999 by Cessna et al. entitled "Framework for Dynamic Hierarchical Grouping and Calculation based on Multidimensional Characteristics" and assigned to the assignee of the present invention. This patent is sometimes referred to herein as the Framework Patent.

Pending patent application Ser. No. 09/491,834 filed Jan. 26, 2000 by C. Bialik et al. entitled "Method and System for Database Management for Supply Chain Management" and assigned to the assignee of the present invention. This patent is sometimes referred to herein as the Database Patent.

U.S. patent application Ser. No. 09/781,615 filed concurrently by the inventor of the present document, Iwao Hatanaka, and entitled "Method and System for Incorporating Legacy Applications into a Distributed Data Processing System" and assigned to the assignee of the present invention. This patent is sometimes called the Legacy Application Patent.

Issued U.S. Pat. No. 6,021,493 of Daryl C. Cromer et al. entitled "System and Method for Detecting When a Computer System is Removed from a Network" issued on Feb. 1, 2000 and assigned to the assignee of the present invention. This patent is sometimes referred to herein as the Heartbeat Patent and is useful in detecting whether a client is attached to a server.

BACKGROUND OF THE INVENTION

1. Field of the Invention

The present invention is an improved system and method for automatically managing session resources in a distributed network of processors, such as a client-server environment, where the invention has the particular advantage of automatically releasing those resources allocated to a session when the session ends, whether through a normal ending or through an abnormal ending. More particularly, the present invention includes a session management framework which can be applied to release session resources when the session ends abnormally, e.g., through the halting of an application or the loss of a connection between the server and the client.

2. Background Art

In a client-server environment, a local terminal (sometimes referred to as a client) is connected to a server for the purpose of processing information in a distributed environment. Frequently, the client is itself a data processing system which communicates with a server which is generally a data processing system with increased resources, including applications and data which are not available at the client application. Such a system is described in some detail in the Framework Patent referenced above. In a client-server environment, resources may be centrally managed at the server as opposed to being disparately managed at each individual client. In some cases, the client does not have the capability of managing or maintaining large resources.

The client is frequently located at a distance from the server and communicates with the server using telecommunication facilities, including hardware and software operating over phone service such as might be provided using telephone lines, either alone or in combination with other communication systems such as satellite or microwave communications. A series of communications occur between a client and its server (for example, to execute an application on the server using data supplied by the client and report the results of the application back to the client) is sometimes referred to as a session, with a session including a plurality of communications between the server and the client. In any event, there are frequently several different links in the communications chain, and when one of the links fails to operate, the communications channel is disrupted and the session is terminated.

While the session was in existence, various resources at the server are dedicated or reserved for the use of the particular client which requests use of those resources. So, in a supply chain application, a variety of storage units associated with the server may be used by a client during a session and various applications and databases may be dedicated to the client and its session, often to the preclusion of using those same resources for other clients while a session with the one client is in progress. Such a preclusion is understandable, particularly when an application may be changing the application or the database, so access during a change by another application may provide the wrong execution or the wrong data.

A session with a client "ties up" resources generally (memory used for one application cannot be used at the same time for another application) and for some specific reasons (a client which is using a database typically marks the database so that another client cannot simultaneously use the database and change the information stored in the database while the other client is using the database, for example).

Since the resources are limited and other clients may want to use the same resources, it is advantageous to release the resources as soon as the resources are not needed, and the normal termination of a session (e.g., the completion of execution of a program) typically provides a release of the resources which have been used for the session as a part of the normal ending of the session.

But, when a session is abnormally terminated, it does not go through the normal ending or winding down process which releases the resources. In fact, many of the events which contribute to the abnormal termination of a session result from a total lack of communications with a client, perhaps because the connection between the client and the server is no longer functional. This is becoming more of a problem when the communication is over the public Internet or a virtual private networks, where a large number of users are connected through paths which are constantly changing as the network evolves, and the session depends on the continuing availability of a path between the client and the server.

The Legacy Application Patent describes an approach to allow use of legacy applications in a distributed processing environment, allowing legacy applications which were not designed to be utilized in a distributed processing system to be used in such a system. Such a system inherently requires that resources which are being used in a distributed data processing system be committed to the use and be released once the processing has ended.

Several approaches have been suggested for determining when a session is no longer active. One of these involves polling, or making sure that the client and the server remain active by periodically issuing an inquiry from the one to the other with an answer back if the connection is still in place. This involves setting up some kind of periodic inquiry system and keeping track of when an inquiry is due for each of the clients, an exercise which requires resources and does not necessarily provide a prompt notice that a client has been dropped by the network—that is, without a lot of repeated polling of each client every short interval, the server does not know which clients remain attached and which clients are no longer attached. But, polling requires continuing use of resource and suggests that polling ought to be done at lengthy intervals to reduce the use of network resources, but the longer the interval, the longer resources may be dedicated to serve a session which no longer exists.

A prior art system for determine whether a resource is attached sometimes uses a "heart beat" technique for determining whether the resource remains attached. But, in such a system a ping is sent out addressed to the remote user and the absence of a response is taken to mean that the resource is not attached, when, in fact, the ping or its response may have been misdirected or lost in the system without the resource actually being disconnected. Another disadvantage of polling is that message traffic is increased for each client which is added to the system. Also, there is the lack of an unequivocal indication that a resource is no longer needed or that a client is no longer connected.

Accordingly, the prior art systems have undesirable disadvantages and limitations.

SUMMARY OF THE INVENTION

The present invention overcomes the limitations and disadvantages of the prior art systems by providing a system and method for releasing resources dedicated to a session promptly, even when the session ends abnormally and without a termination message.

The present invention has the advantage that it is simple and easy to implement to allow for the release of resources held for a client when the client is no longer connected to the server.

The present invention allows for the prompt reallocation of resources from a client to an other client when the first client is no longer using the resource without polling or a periodic inquiry of the connected status of each of the clients using resources of a given server.

The present invention involves setting up a resource manager for each session and logging the use of resources associated with that session. Then, when the session is no longer active—for whatever reason, including normal disconnection or a lost connection, the resource manager consults the listing of resources associated with that session and releases the resources for use, allowing use with other sessions.

Using the resource manager for normal and abnormal session terminations means that it is not necessary to have two different types of session terminations, one for normal terminations and a different one for an abnormal termination.

The present system also allows for a table which identifies which resource is associated with which user.

The present application is suited for use in a system such as are described in the Legacy Application Patent. The use of a distributed data processing solution means that different processors may have reserved resources such as applications which need to be resolved when a session ends.

A system such as the Heartbeat Patent may be used to determine whether a client is attached to the server at any given time. By periodically querying the clients, it is possible to determine whether the client is still coupled to the server or if the connection has been lost for some reason. The Heartbeat Patent is one way (but certainly not the only way) to determine whether the client is still coupled to the server and capable of communicating. If the Heartbeat Patent detects that a given client is no longer attached, it can signal the server to allow release of the resources associated with the client.

Other objects and advantages of the present invention will be apparent to those skilled in the relevant art in view of the following description of the preferred embodiment, taken together with the accompanying drawings and the appended claims.

BRIEF DESCRIPTION OF THE DRAWINGS

The present invention is an improved system and method for resource cleanup, an embodiment of which is illustrated with reference to the accompanying drawings in which:

FIG. 3, consisting of FIG. 3A and FIG. 3B, are diagrams illustrating resource tables useful in practicing the present invention.

DETAILED DESCRIPTION OF THE PREFERRED EMBODIMENT

In the following description of the preferred embodiment, the best implementation of practicing the invention presently known to the inventors will be described with some particularity. However, this description is intended as a broad, general teaching of the concepts of the present invention in a specific embodiment but is not intended to be limiting the present invention to that as shown in this embodiment, especially since those skilled in the relevant art will recognize many variations and changes to the specific structure and operation shown and described with respect to these figures.

Figure 1:
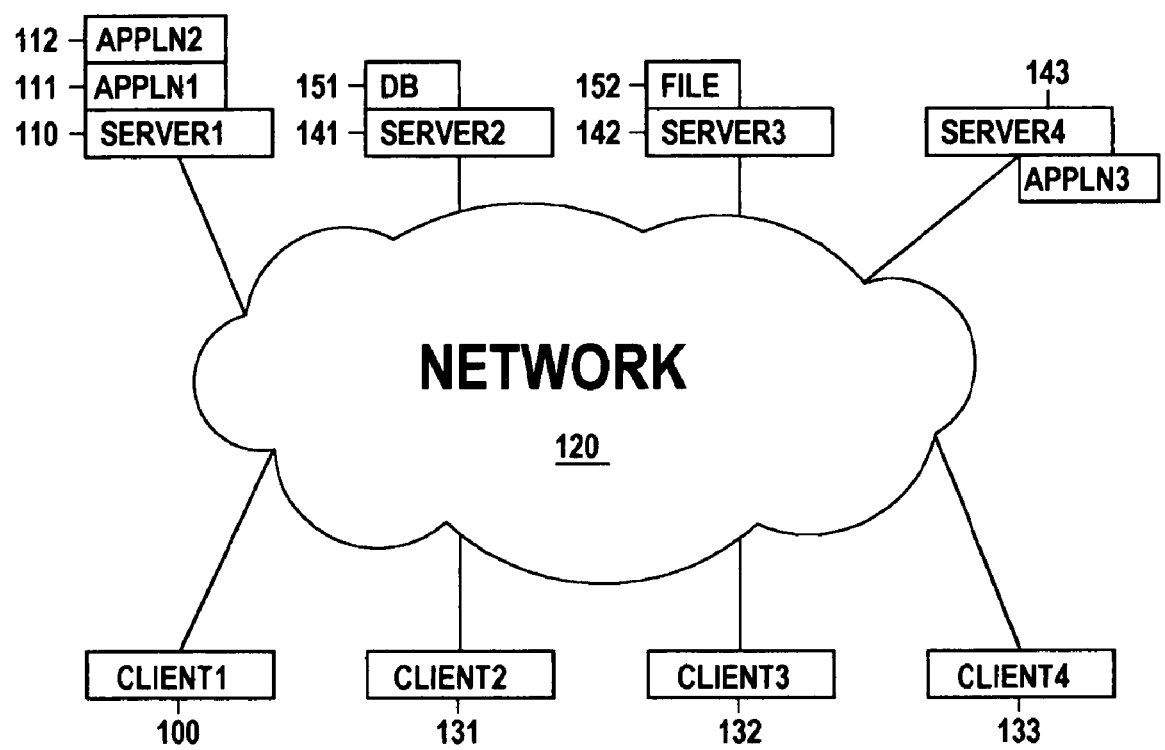
FIG. 1 depicts a communications system representative of the preferred embodiment of the present invention.

FIG. 1 illustrates a communications system of the type used in the present invention. In this FIG. 1, a first client (CLIENT1) 100 is connected to a first server (SERVER1) 110 through a network 120. Additional clients (CLIENT2, CLIENT3, CLIENT4) 131, 132, 133, respectively are shown also connected to the first server 110 through the network 120 and additional servers (SERVER2, SERVER3 and SERVER4) 141, 142, 143, respectively are also shown connected to the network 120. While this is a simplistic view of a network in which a plurality of servers are connected to serve a plurality of clients, it will allow discussion of the problems with such an arrangement and an understanding of the present invention and its advantages. The first client 100 may involve an application which uses a resource at the first server 110 (for example, an application APPLN1 referred to by the reference numeral 111) and a resource at the second server 141 (for example, a database DB referred to by the reference numeral 151) and store the result in a file 152 maintained on the third server 142 (the file 152 might be a file with pro forma income and profit projections), all of which data processing is accomplished through the communications network 120 which connects the client 110 with the servers 110, 141 and 142. Meanwhile, the second client 131 may wish to use resources at the first server 110, the second server 141 and a fourth server 143. If the second client 131 is using different resources at the servers from the other clients at any given time, then there is no problem. If, however, the first client 100 is using the particular application APPLN1 111 at the first server 110, then the second client may not be permitted to use the application APPLN1 111 at that same time, but would be permitted to use an application APPLN2 112 which is also at the first server.

The present invention leverages the fact that each client session with a server is associated with a single file descriptor in the server during a client connection to the server. All communications from and to that client takes place through that file descriptor. Through a callback program associated with that file descriptor, client termination events can be captured to trigger desired system processing at precisely the time that the client disconnects from the server. This functionality allows for automatic session clean-up by detecting client termination and then freeing up corresponding resources being held on the server for the terminated client session.

Figure 2A:
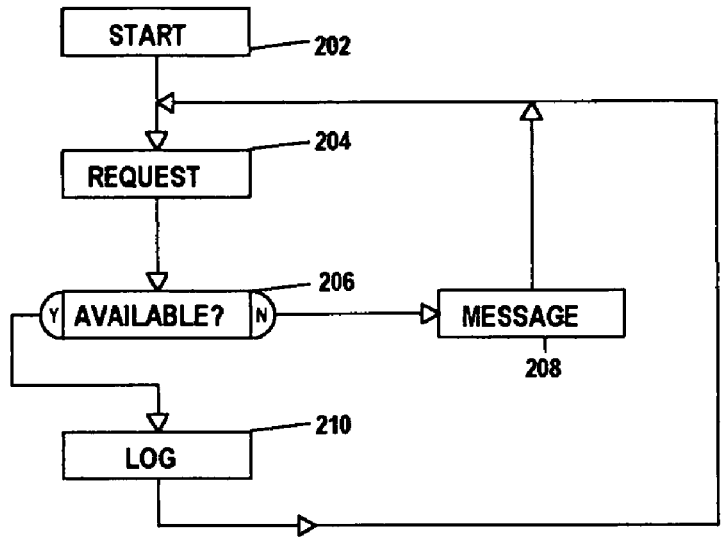
FIG. 2, consisting of FIG. 2A and FIG. 2B, are flow diagrams of the preferred embodiment of the present invention.
Figure 2B:
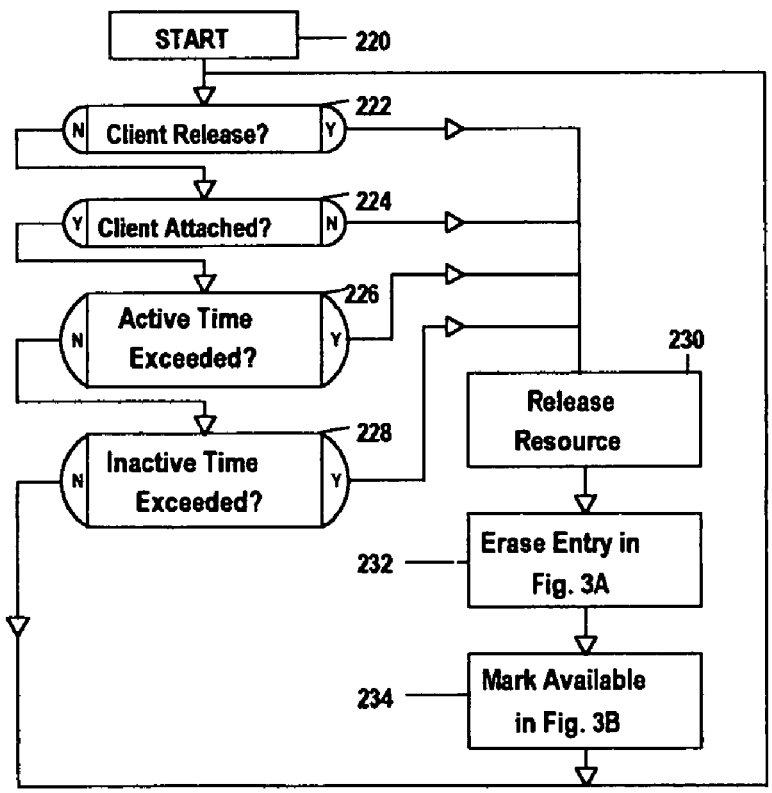

FIG. 2 illustrates in flow diagram form the logic of the present invention showing aspects of the present invention. FIG. 2 consists of FIG. 2A and FIG. 2B. FIG. 2A shows logic for the determination of whether a resource is available and assigning the resource to a particular requesting client while FIG. 2B shows logic for determining whether to release a resource and the steps taken to release that resource and allow for further use of the resource by other clients.

FIG. 2A illustrates the process of a client using resources at a server as was described in connection with FIG. 1. The process starts at block 202 and at block 204 a request is received by the server for resources associated with that server, resources which may be use of an application, access to a database stored on the server or simply to a block of memory, for example, as a temporary storage for an application. While the server may have a large number of resources and many of these resources are not unique (one block of empty memory may be similar to the next), others of the resources are unique (the server may have a single copy of an application or a database) and the resources are limited (the server might well run out of memory if the memory were not released and reused by a second client after the first has completed its processing). Based on the request received at the block 204 for resources, at block 206 the server determines whether the resource is available to the requesting client. Such availability is determined in connection with resource listings such as FIG. 3, particularly FIG. 3B which identifies each resource as being available or being used by a named client. If the client is requesting use of a database already in use by another client or if the memory requested is not available, then the request is denied at block 208 with an appropriate message ('resource in use; try again later" or "inadequate memory presently available; try elsewhere or try again later"). If, on the other hand, the resource is available for the client, then at block 210, access is granted and the resource is logged (see FIG. 3 and the associated text for a discussion of the logging process to include identification of which resources are available and which are used by which clients) as assigned to the requesting client. In any event, following the disposition of a request for resources, either by granting it at block 210 or denying it at block 208, control returns to the starting area where the next request can be processed by the block 204.

FIG. 2B illustrates the process for releasing a resource which has been assigned to a client and for which the client no longer has a need for the resource. Such a release may be because the program using the resource has run its course and terminated successfully or because something unnatural has occurred, like the client has become disconnected from the server—i.e., either the server 110 or the client 100 is no longer connected to the network 120 or the client 100 is no longer operational. While a normal termination of an application program may issue the explicit command to release the resources that the application has been using, the program may abort or otherwise not issue such a command.

The process of FIG. 2B is as follows: starting from block 220, at block 222 the question is asked whether a client has specifically released a resource. If not, then at block 224, it is determined whether the client remains attached to the network. This determination can be made through any of a number of conventional approaches, such as "pinging" the client or by determining a heartbeat of the client using the Heartbeat Patent referenced above. If the client is present, then control passes to an optional set of time determinations which serve to limit the time that a resource can be used—either with activity or without activity. Associated with the resource (e.g., an application, database or memory) and/or the client are allowable time intervals. For example, a client may use a first application for 30 minutes but will be considered inactive if no activity occurs within a 15 minute time period. Thus, at block 226 the amount of time a resource has been used will be compared with an allowable time for such use (if any has been set) by comparing the present time with the beginning time which was stored in column 308 of FIG. 3A to determine the amount of time the resource has been in use. If the time that the resource has been used does not exceed the limit, then the amount of inactive time is compared at block 228. That is, the period since the last use (in column 310 of FIG. 3) to the present is compared with a threshold (if set) to determine whether the resource has been held without activity longer than a preset period of time. If the client released the resource (at block 222), the client is not attached (at block 224), the time of use (block 226) or the time of inactivity (block 228) exceed the set limits, then the resource is released at block 230 with the entry in the table of resources being used (FIG. 3A) erased at block 232 and the resource marked as available in the listing of FIG. 3B at block 234. Control then returns to the start for the next resource action.

FIG. 3 shows resource tables useful in practicing the present invention. In FIG. 3A, a first table 300 depicts in list form the resources currently being used and the client using each of the resources. Although only a portion of this table 300 is shown to illustrate the principles of the present invention, the table could be as large as necessary to contain data about all the clients using the server and the resources that each of the clients is currently using. The table includes a first column 302 which lists the resource being used, a second column 304 listing the client using the resource, a third column 306 indicating the type of access (whether it is read only or read/write), a fourth column 308 indicating the time which the resource was first accessed and a fifth column 310 indicating the time that the resource was last used. Use of the fourth column 308 with the beginning time allows for a time limit to be set for release of the resource after a fixed amount of time and the fifth column 310 (last use) allows for a time limit to be set that releases a resource if it has not been used within a fixed period of time. That is, the resource could be released after x minutes of use (based on a comparison of the current time with the start time stored in column 308) or after y minutes of nonuse (based on a comparison of the current time with the time in column 310). The times allowed (x minutes of use, y minutes of nonuse) are subject to system constraints and may be adjusted based on the type of use and whether concurrent uses are permitted. In some situations, a read-only access of a resource may not preclude others' use of the same resource and one client might be permitted to continue to use such a resource on a non-exclusive basis than would be permitted if the resource were being used on an exclusive basis. An optional sixth column 312 provides the time of the last indication that the client is connected, a time which may be provided by receiving a request from the client or from a return "ping" of the client as discussed elsewhere.

In FIG. 3B, a listing of the resources is provided and an associated status for each resource—whether the resource is "free" for use by a client or if it is currently committed to a client and not available. This FIG. 3B lists each of the resources along with its status, by resource. So, FIG. 3B includes a left column 330 which lists the resource and a right column 332 which either lists the resource as being used by a named client or being available. This, for the simple example of FIG. 1, APPLN1 is shown in block 334 as a resource and in block 344, it is being used by client 110. APPLN2 is listed in block 336 as a resource and in block 346, it is being used by client 131. APPLN3 is listed in block 338 as being available in block 348. Similarly blocks of memory and other resources such as the database DB can be assigned to a particular client, and at the end of the use by that client, release by removing the entry in the columns of FIG. 3.

The present invention can be realized in hardware, software, or a combination of hardware and software. A data processing tool according to the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

"Computer program means" or "computer program" in the present context mean any expression, in any language, code or notation, of a set of instructions intended to cause a system having an information processing capability to perform a particular function either directly or after either or both of the following a) conversion to another language, code or notation; b) reproduction in a different material form.

While the present invention is described in the context of an apparatus and a method of providing resource management, the present invention may be implemented in the form of a service where collecting, maintaining and processing of information is located apart from the server and information is communicated as needed to the server.

Of course, many modifications of the present invention will be apparent to those skilled in the relevant art in view of the foregoing description of the preferred embodiment, taken together with the accompanying drawings. For example, the system for recognizing that the session between the client and the server no longer exists may be determined in any manner and is not limited to that disclosed in the foregoing material. Additionally, the location and type of information maintained about a session may be modified to suit the application and need not be the listing of resources associated with each client as disclosed. Such information may be stored in connection with each resource being used rather than in a central location, although there are advantages to having the information located centrally in that a central location makes it easier and quicker to release and reuse the resource again. Additionally, certain features of the present invention may be useful without the corresponding use of other features without departing from the spirit of the present invention. For example, a client may be using several resources associated with different applications and one application may end (so the resources associated with that application should be released) or the entire connection may terminate (so all applications terminate). Further, the system of FIG. 3B arranges data on resource use including the same data as FIG. 3A, and the two could be combined, if desired, using a single database to show what resources are in use and what clients are using the resource. Accordingly, the foregoing description of the preferred embodiment should be considered as merely illustrative of the principles of the present invention and not in limitation thereof.

Having thus described the invention, what is claimed is:

1. A system comprising:
    at least one computing system for managing the use of a set of processing resources in a distributed data processing system where a remote client uses active processing resources at a server for a limited duration via an individual client session, the at least one computing system including:
        a stored listing of at least one active processing resource being used at the server and the remote client using the at least one active processing resource via the individual client session,
        wherein each individual client session between the server and the remote client is associated with a single file descriptor in the server;
        a resource management system which monitors communications through the single file descriptor in the server to identify when the remote client is no longer using the at least one active processing resource at the server, the resource management system including a timing system for determining at least one of a period of use by the remote client or a period of inactivity by the remote client; and
        a release system which, in response to the resource management system identifying that the remote client is no longer using the at least one active processing resource at the server, is configured to access the stored listing and automatically remove the at least one active processing resource which had been used by the remote client when the remote client was connected to the server,
        whereby the at least one active processing resource being used by the remote client is made available for use by other clients after the remote client has disconnected from the server.

2. A system for managing the use of processing resources in a distributed data processing system including the elements of claim 1, wherein the resource management system which identifies that a remote client is no longer using the at least one active processing resource at the server includes a mechanism for determining that the remote client is no longer connected to the server through a data transmission network.

3. A system for managing the use of a processing resource in a distributed data processing system including the elements of claim 1, wherein the server maintains a listing of each of the clients using the at least one active processing resource associated with the server and the at least one active processing resource which are used by the respective client.

4. A stored program fixed on a non-transitory computer readable medium for controlling the use of a set of processing resources in a distributed data processing system comprising:
    a module which stores a list of active processing resources in the set of processing resources which are being used by an identified client at a server in a distributed data processing system via an individual client session;

wherein each individual client session between the server and the identified client is associated with a single file descriptor in the server;

a module which monitors communications through the single file descriptor in the server in order to determine when the identified client is no longer using the active processing resources associated with the server, the module which monitors communications including a timing system for determining at least one of a period of use by the identified client or a period of inactivity by the identified client; and a module which accesses the stored list to determine the active processing resources used by the identified client and releases the active processing resources in response to determining that the identified client is no longer using the active processing resources associated with the server.

5. A stored program of the type described in claim 4 wherein the module for determining that the identified client is no longer using the active processing resources includes a mechanism for determining that the client is no longer connected to the server.

* * * * *